A. STOWASSER.
MOTOR CYCLE SEAT.
APPLICATION FILED APR. 30, 1917.

1,304,821.

Patented May 27, 1919.
5 SHEETS—SHEET 1.

WITNESSES:

INVENTOR
Anthony Stowasser
BY
ATTORNEYS

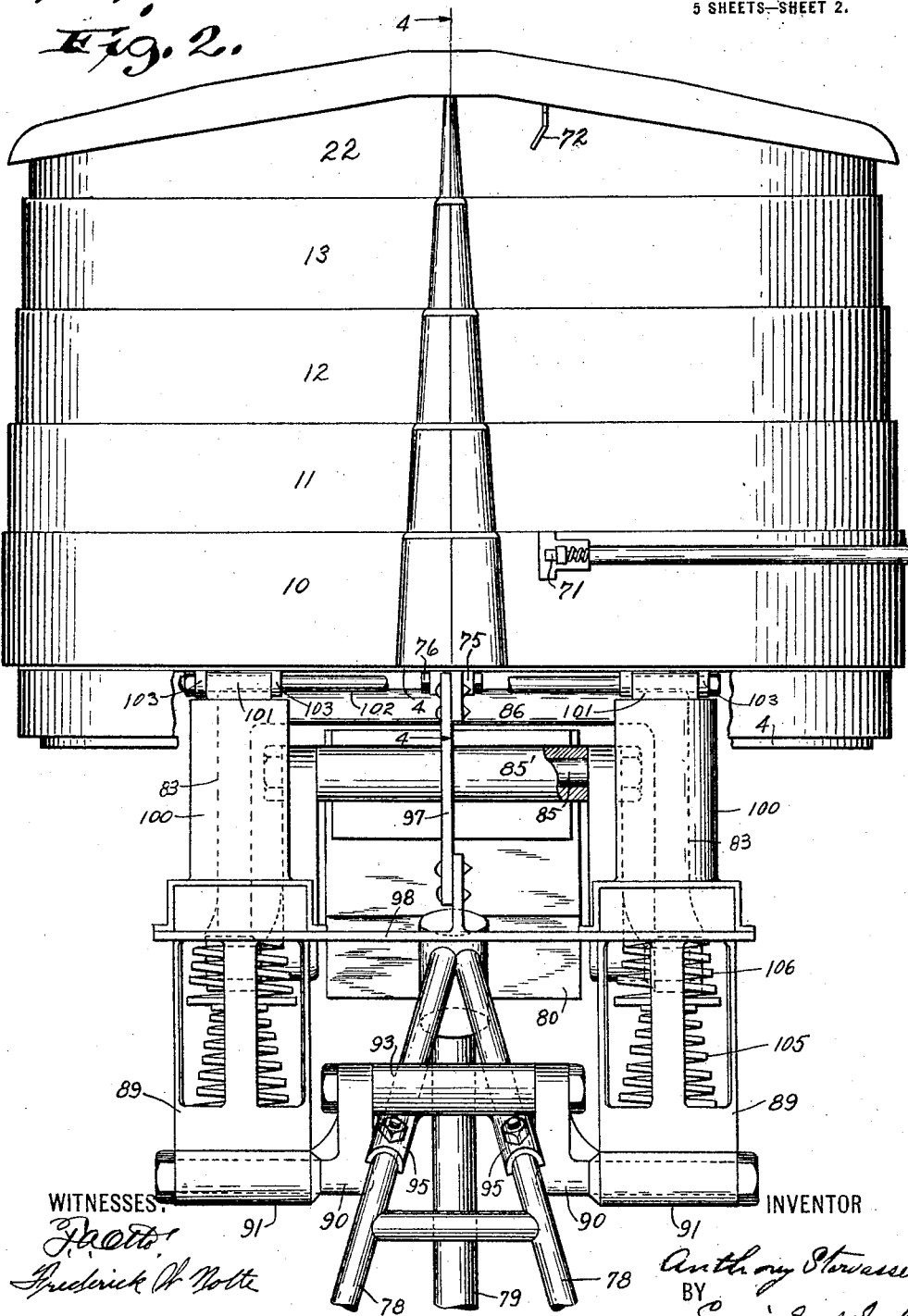

A. STOWASSER.
MOTOR CYCLE SEAT.
APPLICATION FILED APR. 30, 1917.
1,304,821.
Patented May 27, 1919.
5 SHEETS—SHEET 3.
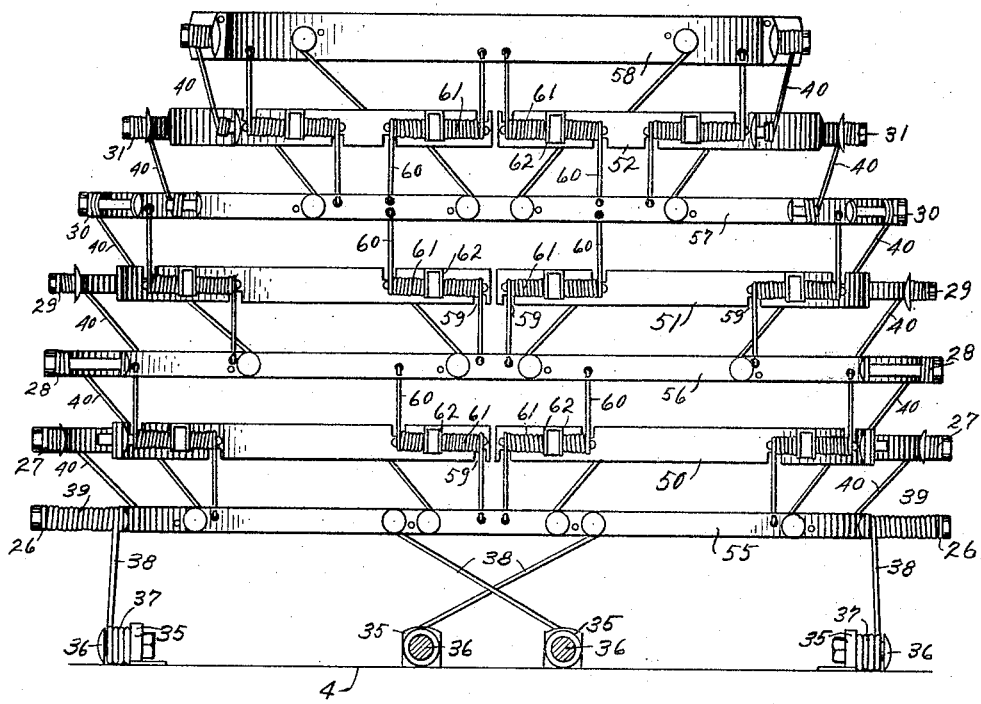
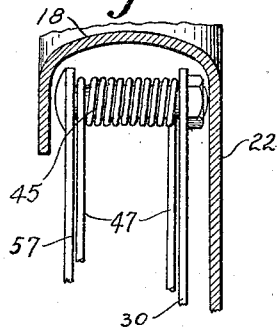
WITNESSES:
INVENTOR
Anthony Stowasser
BY
ATTORNEYS

A. STOWASSER.
MOTOR CYCLE SEAT.
APPLICATION FILED APR. 30, 1917.

1,304,821.

Patented May 27, 1919.
5 SHEETS—SHEET 4.

WITNESSES:

INVENTOR
Anthony Stowasser
BY
ATTORNEYS

A. STOWASSER.
MOTOR CYCLE SEAT.
APPLICATION FILED APR. 30, 1917.

1,304,821.

Patented May 27, 1919.
5 SHEETS—SHEET 5.

WITNESSES:

INVENTOR
Anthony Stowasser
BY
ATTORNEYS

UNITED STATES PATENT OFFICE.

ANTHONY STOWASSER, OF MILWAUKEE, WISCONSIN.

MOTOR-CYCLE SEAT.

1,304,821.   Specification of Letters Patent.   Patented May 27, 1919.

Application filed April 30, 1917.   Serial No. 165,327.

*To all whom it may concern:*

Be it known that I, ANTHONY STOWASSER, a citizen of the United States, residing at the city of Milwaukee, county of Milwaukee, and State of Wisconsin, have invented new and useful Improvements in Motor-Cycle Seats, of which the following is a specification.

My invention relates to improvements in motor cycle seats. The object of my invention is to provide a resilient saddle with folding back and side walls, said walls being also adapted to yield resiliently.

Also, to provide means whereby the back may be folded by turning a crank at one side of the seat near the front, said back being extended automatically when the crank is released by the reaction of supporting springs connecting the various sections, or members, of the back and side walls.

A further object of my invention is to provide improved means for supporting the seat from the frame bars of the motor cycle.

In the drawings:

Fig. 2 is a rear elevation, showing the manner in which my improved seat is mounted upon the motor cycle frame.

Fig. 3 is a detail view of the expanding mechanism for the back and side walls.

Figure 1:
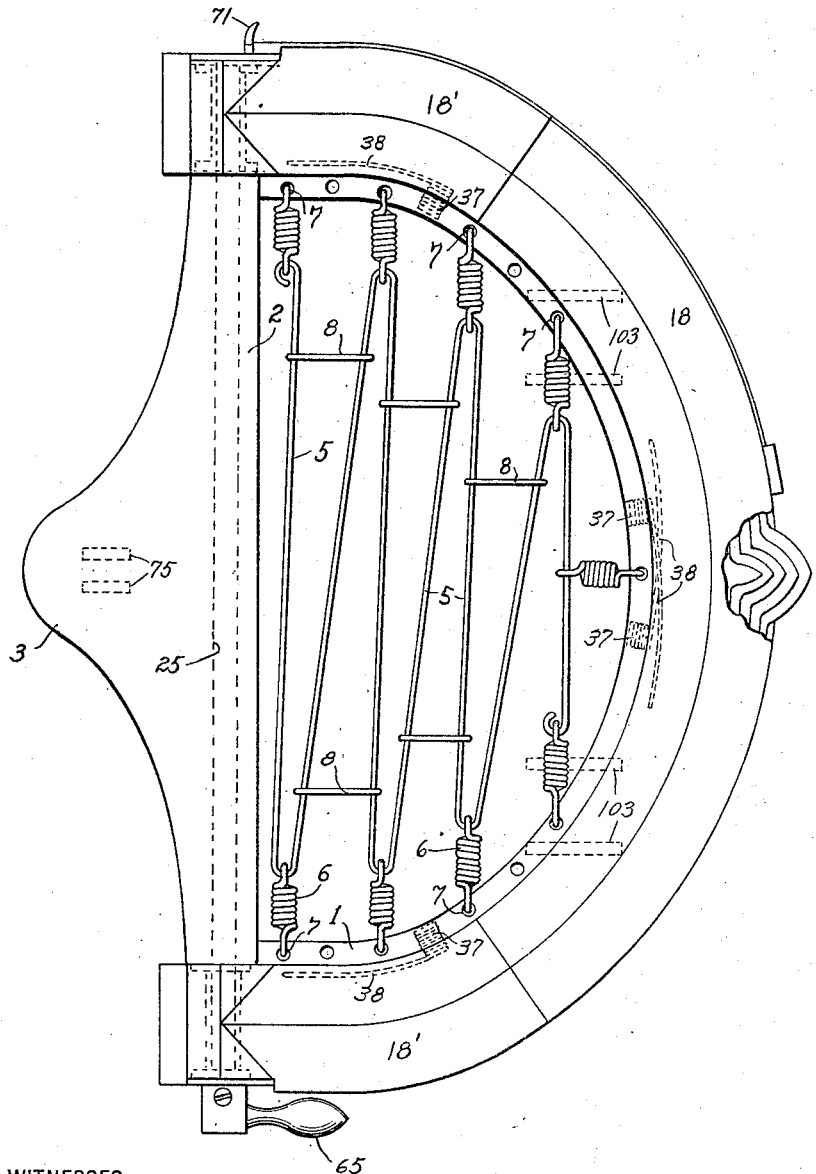
Figure 1 is a plan view of a motor cycle seat embodying my invention, with the cushion removed to show the resilient cushion supporting members of the saddle frame.

Fig. 7 is a detail view showing a fragment of the main bow 18, and its depending skirt 22 in cross section, and with a portion of the outer surface of the bow in perspective, the ends of the upholstery carrying bow 57 within the main bow being exposed, together with one of the studs 45.

Like parts are identified by the same reference characters throughout the several views.

The bottom of the seat comprises a curved channel iron member 1 substantially semicircular, and having its ends connected by a cross bar 2 shaped to form the saddle horn 3, the channel iron member 1 having its lower flange secured to a base plate 4. Strands of wire 5 are looped across the space between the end portions of the upper flange of the channel iron member 1 in zig zag form, the ends of the loops of wire being connected with said flange by resilient links 6, preferably formed of coiled wire, the outer ends of which are hooked into the flange at 7, the inner ends being hooked into the loops formed by the looped strand of wire 5, as shown in Fig. 1. The divergent portions of the several loops of the wire 5 are loosely connected with each other by means of wire links 8. The arrangement of the loops of wire 5, coils 6, links 8, etc., is similar to that commonly employed for spring bed bottoms, and the specific arrangement illustrated is not essential.

The back of the seat is adapted to be folded in order that the rider may mount the seat after starting the motor cycle in accordance with the usual custom. It has heretofore been the practice to make such seats in the form of a simple saddle to facilitate mounting and dismounting, but for long rides the lack of any support at the back causes considerable fatigue, and I have therefore equipped the seat frame above described with a folding back, the walls of which comprise a series of bows adapted to nest upon the base member 4, or around its outer margin and above said member, this back when extended being resiliently supported by an extensible column of supporting bows and other supporting mechanism, as hereinafter described.

The nesting bows 10, 11, 12 and 13 are adapted to form the back and side walls of the seat, the ends of these bows being connected in common with a main bow formed in telescoping sections 18, 18', to which the nesting bows are secured at the pivot points 19, except that the lower nesting bow 10 may be pivotally connected with a cross shaft 25 journaled in the extremities of the main frame bar 1 of the seat, and extending underneath the cross bar 2.

Each of the nesting bows 10 to 13 inclusive has an inturned upper margin 21, and the main bow 18, 18' has a depending skirt 22, the lower margin of which, together with the lower margins of the bows 11 to 13 inclusive, are offset and adapted to fit the inturned margins 21, whereby when the nesting bows are extended the offset portions interlock with said inturned margins 21 to limit the upwardly extending movement.

Figure 4:
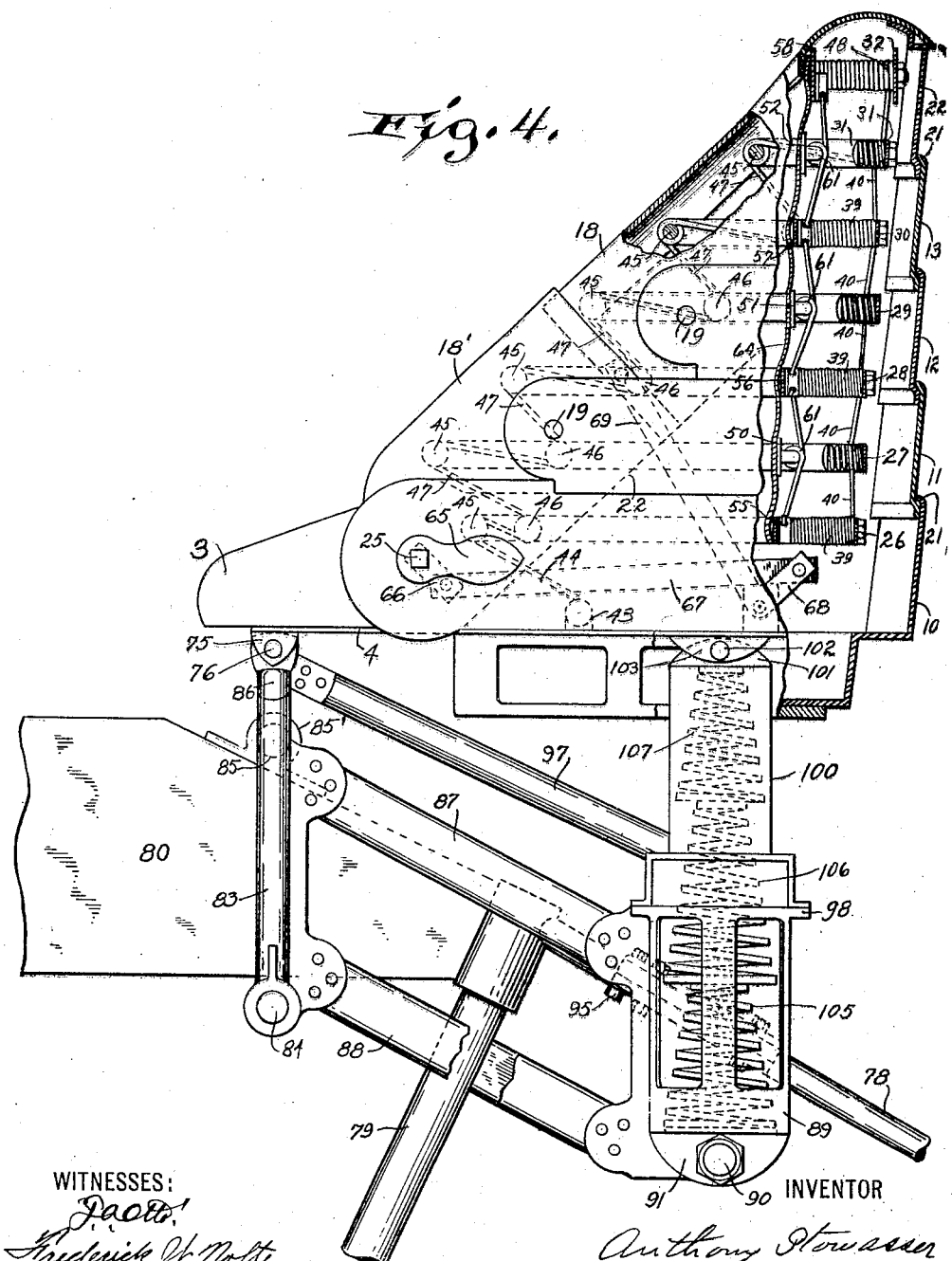
Fig. 4 is a sectional view, drawn on line 4, 4 of Fig. 2.
Figure 5:
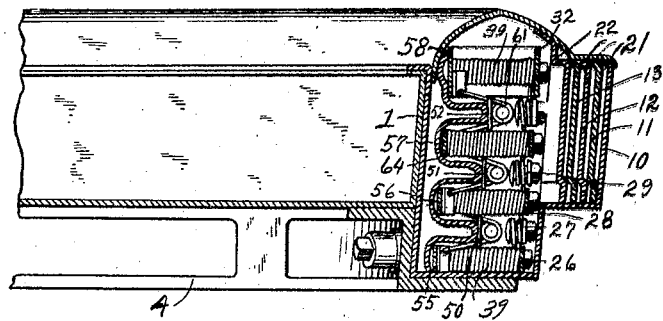
Fig. 5 is a detail sectional view of the same, showing the back of the seat in nested or folded position.

When the back of the seat is extended in position for use the main bow 18, 18' occupies the oblique position in which it is illustrated in Fig. 4, the lower end of the section 18' being pivotally secured to the cross shaft 25. When folded the bows 11 to 13 inclusive, and also the skirt or back wall 22 of the main bow 18, are adapted to nest within the bow 10, as shown in Fig. 5.

The back of the seat tends to spring upwardly to the exended position under upward pressure exerted by a resilient supporting column comprising a set of bow shaped members 26 to 32 inclusive, each successive member being supported from the one preceding it by a set of coiled springs, except as to the bottom member which is supported from the base. In the construction illustrated the base 4 is provided with a set of ear brackets 35, having studs or bolts 36 to receive a coil of wire 37, each coil having one end extended upwardly and obliquely to form a resilient supporting arm 38. Similarly, the bow 27 is supported from the bow 26 by coiled springs 39 mounted on the bow 26, and having upwardly extending arms 40 connected to the bow 27. The succeeding members of the series are successively supported from the preceding ones in a similar manner.

The respective ends of the column of members 26 to 32 inclusive project into the skirting 22 of the main bow. That is to say, the ends of this column of bow shaped members respectively project forwardly along the inner face of the main bow skirting 22 at each side of the seat, and these ends are also spring supported from the base 4, preferably by means of a continuous strand of wire, the lower end of which is coiled and secured to the base 4 at 43, and extended upwardly in the form of a resilient oblique supporting arm 44, the wire being then wound about studs 45 and 46 on one end of the bow shaped member 26, and then again extended in the form of an oblique supporting arm 47, and wound about similar studs upon the corresponding end of the bow shaped member 27, each of the members 26 to 32 inclusive being provided with similar studs 45 and 46 about which the wire is successively wound, whereby the successive ends of the members 27 to 32 inclusive may each be supported resiliently from the one preceding it, by a supporting spring arm 47 comprising a portion of said wire. At the other side of the seat the ends of the bows may be similarly supported from the base, or, if desired, the same wire may be extended across from one side to the other at the top of the main bow and downwardly on the other side. The main bow is provided with a bolt 48 in its upper portion or crown about which the wire is wound, as clearly illustrated in Fig. 4.

By thus connecting the ends of the distending column of members 26 to 32 inclusive by a strand of wire wound upon a plurality of studs 45 and 46 on each member, I am enabled to hold this column of members in substantially parallel horizontal position. When extended they are supported at the back and kept from sagging by means of the springs 40 above described. The members 26 to 32 inclusive are sufficiently narrow so that they can be folded to a superposed position within the bow 10, as best shown in Fig. 5. They are sufficiently distant from the bow 10 to allow the other bows 11 to 13 inclusive, and the skirting 22 to nest between the distending column and said bow 10.

Between the distending column, formed by the bow shaped members 26 to 32 inclusive, and the correspondingly curved main bar 1 of the seat frame there is sufficient space to receive an extensible upholstery supporting frame which will now be described.

The upholstery supporting frame is also formed of bow shaped members comprising an outer set of floating spring supporting bows 50 and 51, and 52, and an inner set of upholstery carrying bows 55, 56, 57 and 58. Each floating bow is provided with a set of coiled springs 61 on its outer or convex side, the ends of which are extended inwardly through notches 59 in the upper and lower margins of the bow respectively to form resilient divergent supporting arms 60, linked to successive upholstery carrying bows in such a manner that they tend to spread the same. The coils 61 of these springs are wound upon bolts or other horizontally extending projections connected with brackets 62 on the convex faces of the floating bows. The upholstery 64 is adapted to fold outwardly in the spaces between the bows 55 and 56, 56 and 57, respectively, when the back of the seat is adjusted to nested or folded position.

A crank 65 is secured to cross shaft 25. The latter has an arm 66 at each end, which swings when the crank is actuated to oscillate the shaft and transmits motion to the main bow through link 67 and elbow lever arms 68 and 69. Arm 69 is pivoted to the skirting 22 of main bow section 18 and when the crank swings downwardly from its position as shown in Fig. 4, the upper section 18 of the main bow slides downwardly into section 18' and the bow swings backwardly upon the pivot shaft 25, compressing the spring column, whereby its members 26 to 32 are forced into proximity back of main frame bar 1, and the sections 10 to 13 of the back are nested in the rear of the column. The upholstery frame also folds in front of the spring column between it and the seat frame bar 1, and a latch 71 and catch 72 (Fig. 2) locks the parts in folded position. The rider may then dismount without being inconvenienced by the back of the seat, and when remounted, and the latch released, the springs will automatically distend the back to position of use.

Figure 6:
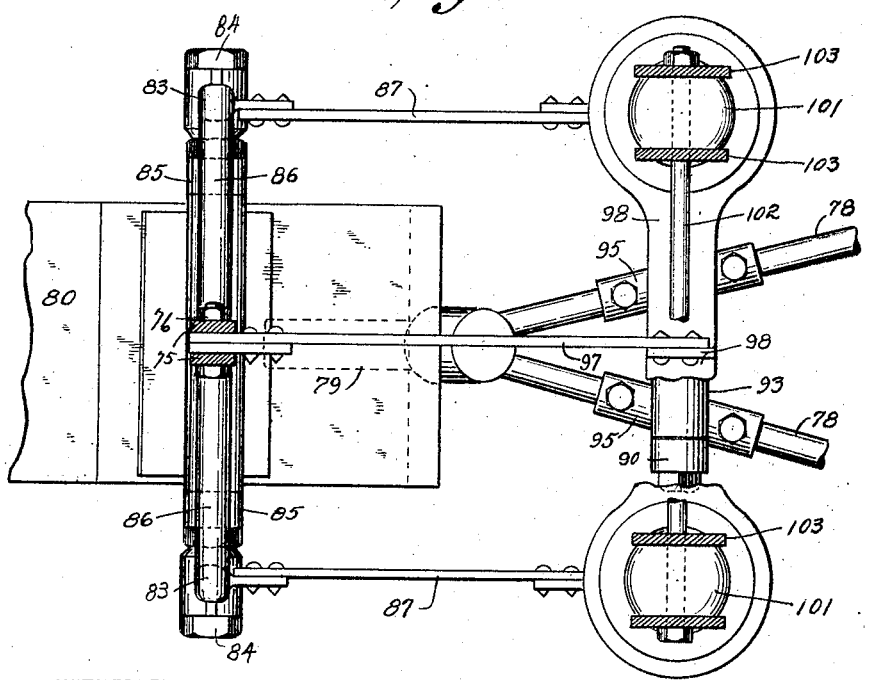
Fig. 6 is a plan view of the supporting frame and clamping devices for connecting such frame with a motor cycle frame.

The front portion of the base 4 is provided with depending ears 75 pivoted to a cross bolt 76, which connects these ears with a saddle frame, employed to support the seat from the main frame of the motor cycle, said main frame including the rear fork arms 78, posts 79 and tank 80, fragments of which are illustrated in Figs. 2, 4 and 6. The front end of the saddle frame comprises a set of posts 83 which straddle the tank 80, with their upper ends connected above the tank by a cross bar 86 integral with the posts. The lower ends of the posts 83 are hung upon crank pins or studs 84 by means of a crank shaft 85 having depending arms, upon the lower ends of which the studs 84 are carried. The crank shaft 85 is hung in a supporting bearing sleeve 85', mounted on the tank 80. Each of the posts 83 is connected by frame bars 87 and 88 with a spring supporting socket 89. These sockets 89 are located on opposite sides of the rear fork, as best shown in Fig. 2, and are supported therefrom by a crank shaft 90 journaled in suitable bearing members 91 at the bottom of the spring sockets with the central or offset portion of the crank hung to oscillate in a sleeve 93 connected with the rear fork by clamping members 95. A brace 97 connects cross bolt 76 with a rear cross bar 98, to which the upper ends of the spring sockets 89 are connected.

Each of the spring sockets is provided with a cup shaped extension 100 which telescopes in the socket, its upper end being provided with a cap 101 pivotally connected with a cross rod 102, journaled in depending ears 103 secured to the bottom surface of the base 4, the cap 101 being therefore pivotally connected with said base 4. A set of helical springs 105, 106 and 107 is located in each of these spring sockets, the upper spring 107 being arranged to support the cap, and each of the lower springs being arranged to support the one above it. The socket and its extensible section form a housing, and the sockets may be partially filled with grease or oil, whereby the springs will be kept lubricated and protected from dust, moisture or mud which would otherwise be thrown upon them by the rear wheel of the motor cycle.

The spring sockets, frame bars 87 and 88 and posts 83, together with crank shaft 90, cross bar 98 and the cross bar 85, which connects the upper ends of posts 83, together with the brace 87 constitute the seat supporting frame, this frame being a rigid frame supported from a motor cycle frame by crank shafts 85—86 and 90, whereby the motor cycle frame may oscillate or move relatively to the saddle frame toward the front or rear without causing violent vibration of the seat. The rear portion of the seat, however, is resiliently supported by the springs 105, 106 and 107 so that it may move vertically.

I claim:

1. A motor cycle seat, comprising the combination with a main saddle frame, of a back composed of a set of telescoping interlocking bows, adapted to slide, one upon the other, into nested position, and means for supporting said back in an extended position.

2. A motor cycle seat, comprising the combination with a main saddle frame, of a back composed of a set of telescoping interlocking bows, adapted to slide, one upon the other, into nested position, and means for supporting said back in an extended position, together with an auxiliary frame composed of upholstery supporting bows, resiliently spaced apart when the back is extended, and adapted to fold with the back to nested position.

3. A motor cycle seat, comprising the combination with a main saddle frame, of a back composed of a set of telescoping interlocking bows, adapted to slide, one upon the other, into nested position, means for supporting said back in an extended position, and lever mechanism adapted to adjust the back to either the extended or nested position.

4. A motor cycle seat, comprising the combination with a main saddle frame, of a back composed of a set of telescoping interlocking bows, adapted to slide, one upon the other, into nested position, means for supporting said back in an extended position, lever mechanism adapted to adjust the back to either the extended or nested position, and means for resiliently supporting upholstery within the back, in either the extended or nested position.

In testimony whereof I affix my signature in the presence of two witnesses.

ANTHONY STOWASSER.

Witnesses:
O. C. WEBER,
FREDERICK W. NOLTE.